(12) United States Patent
Gokyiğit

(10) Patent No.: US 11,354,371 B2
(45) Date of Patent: Jun. 7, 2022

(54) PROGRESSIVE CHAIN NETWORK GRAPH, MAP AND SEARCH ENGINE

(71) Applicant: Lale Ann Gokyiğit, Istanbul (TR)

(72) Inventor: Lale Ann Gokyiğit, Istanbul (TR)

( * ) Notice: Subject to any disclaimer, the term of this patent is extended or adjusted under 35 U.S.C. 154(b) by 52 days.

(21) Appl. No.: 16/616,918

(22) PCT Filed: Nov. 7, 2017

(86) PCT No.: PCT/TR2017/000117
§ 371 (c)(1),
(2) Date: Nov. 25, 2019

(87) PCT Pub. No.: WO2019/093977
PCT Pub. Date: May 16, 2019

(65) Prior Publication Data
US 2020/0242182 A1    Jul. 30, 2020

(51) Int. Cl.
*G06F 16/9536* (2019.01)
*G06N 20/00* (2019.01)
*G06F 16/28* (2019.01)
*G06F 16/9535* (2019.01)
*G06F 16/901* (2019.01)
*G06F 3/0482* (2013.01)
*G06F 3/0485* (2022.01)
*G06Q 10/10* (2012.01)
(Continued)

(52) U.S. Cl.
CPC ........ *G06F 16/9536* (2019.01); *G06F 3/0482* (2013.01); *G06F 3/0485* (2013.01); *G06F 16/288* (2019.01); *G06F 16/9024* (2019.01); *G06F 16/9535* (2019.01); *G06N 20/00* (2019.01); *G06Q 10/10* (2013.01); *G06Q 50/01* (2013.01); *H04L 51/32* (2013.01); *G06F 2203/04806* (2013.01)

(58) Field of Classification Search
CPC .............. G06F 16/288; G06F 16/9535; G06F 16/9024; G06F 16/9536; G06F 2203/04806; G06F 3/0482; G06F 3/0485; G06L 51/32; G06N 20/00; G06Q 50/01; G06Q 10/10
See application file for complete search history.

(56) References Cited

U.S. PATENT DOCUMENTS 8,055,788 B1 * 11/2011 Chan ...................... G06Q 10/10
709/238
2011/0307803 A1 * 12/2011 Carter ................... G06Q 10/10
715/751
(Continued)

*Primary Examiner* — Etienne P Leroux
(74) *Attorney, Agent, or Firm* — Bryant J. Keller; Kirton McConkie

(57) ABSTRACT

The invention, forming a mutual/collaborative puzzle, message/letter chain consisting of information chains that form graphs, lists, or groups, the ability to use defined or calculated measuring units such as distance measured in hops, volume measured in followers, and/or the nature of relationship, according to needs and purposes, using/defining measurements for various needs, to facilitate socializing, sharing, with a search engine accessing information on social networks more efficiently, in a more detailed and speedy way while preventing information pollution, by doing Word, Picture, audio etc. searches, to be used not just for social purposes but research and rapid information attainment, not only for apps but for social media, TV, games.

19 Claims, 1 Drawing Sheet

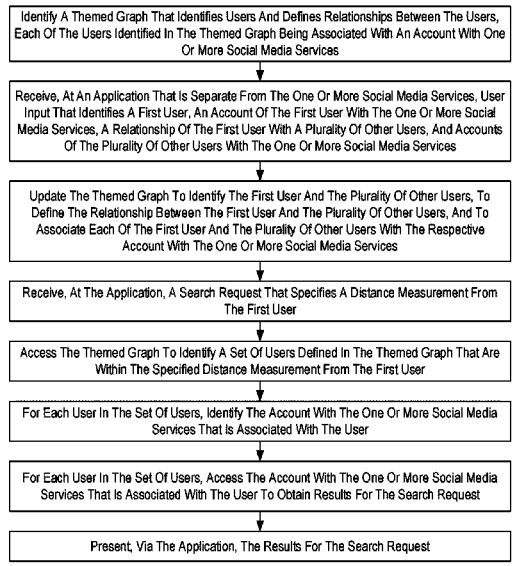

(51) Int. Cl.
  *G06Q 50/00*  (2012.01)
  *H04L 51/52*  (2022.01)

(56) References Cited

U.S. PATENT DOCUMENTS

| | | | |
|---|---|---|---|
| 2012/0311036 A1* | 12/2012 | Huhn | H04L 51/28 |
| | | | 709/204 |
| 2013/0030905 A1 | 1/2013 | Fuloria et al. | |
| 2014/0082086 A1* | 3/2014 | Srikrishna | G06F 16/9535 |
| | | | 709/204 |
| 2014/0324741 A1* | 10/2014 | Stewart | G06N 20/00 |
| | | | 706/12 |
| 2015/0149315 A1* | 5/2015 | Tischer | G06Q 30/0601 |
| | | | 705/26.1 |
| 2016/0162502 A1 | 6/2016 | Zhou et al. | |
| 2016/0203036 A1* | 7/2016 | Mezic | G06F 11/079 |
| | | | 714/819 |
| 2017/0161318 A1* | 6/2017 | Bigelow | G06F 16/2379 |
| 2017/0272447 A1* | 9/2017 | Chen | H04L 63/083 |
| 2019/0080626 A1* | 3/2019 | Dey | G09B 19/06 |

* cited by examiner

```
Identify A Themed Graph That Identifies Users And Defines Relationships Between The Users,
Each Of The Users Identified In The Themed Graph Being Associated With An Account With One
                              Or More Social Media Services
                                           │
                                           ▼
Receive, At An Application That Is Separate From The One Or More Social Media Services, User
 Input That Identifies A First User, An Account Of The First User With The One Or More Social
Media Services, A Relationship Of The First User With A Plurality Of Other Users, And Accounts
          Of The Plurality Of Other Users With The One Or More Social Media Services
                                           │
                                           ▼
Update The Themed Graph To Identify The First User And The Plurality Of Other Users, To
Define The Relationship Between The First User And The Plurality Of Other Users, And To
Associate Each Of The First User And The Plurality Of Other Users With The Respective
                   Account With The One Or More Social Media Services
                                           │
                                           ▼
 Receive, At The Application, A Search Request That Specifies A Distance Measurement From
                                      The First User
                                           │
                                           ▼
Access The Themed Graph To Identify A Set Of Users Defined In The Themed Graph That Are
                 Within The Specified Distance Measurement From The First User
                                           │
                                           ▼
  For Each User In The Set Of Users, Identify The Account With The One Or More Social Media
                            Services That Is Associated With The User
                                           │
                                           ▼
For Each User In The Set Of Users, Access The Account With The One Or More Social Media
   Services That Is Associated With The User To Obtain Results For The Search Request
                                           │
                                           ▼
              Present, Via The Application, The Results For The Search Request
```

PROGRESSIVE CHAIN NETWORK GRAPH, MAP AND SEARCH ENGINE

TECHNICAL AREA

The invention offers service around two main concepts or categories.

The first concept or category, entails graphs or lists that have been formed with information chains (in a similar way puzzles could come together with different people holding different pieces of the puzzle or chain letters/messages travel). Some methods have been offered for the chains to spread rapidly. The lists and graphs are capable of containing features in which the distance and/or nature of relationships between members can be observed and used. The module or unit of measurement for distance between members, can be defined in different ways depending on the needs. The lists or graphs also can contain features enabling social interaction and sharing among members.

The second concept or category, is a search engine feature that enables detailed, fast access of information shared on social media platforms avoiding information pollution, through Word, Picture or other recognition searches. In addition to being used for social purposes, it provides a service that can be used for research purposes or attaining information more quickly. This second concept may be offered as a sub-service/feature under the first concept or it may be provided as separate application in its own right that can be used for various research needs or other purposes.

Although possible services and benefits of these two concepts have been explained in more detail, they both hold the possibility for many more uses and services.

Known Situation Related to the Technique

In today's world, it is vitally important to be able to find information rapidly and in a way that avoids information pollution. In addition to this, scarcity of time means that the need to form social ties among relatives or around other themes is pressing. Themes, graphs that show the qualities of members, distance measurement features between members can increase the ability to form social ties and our search engine that searches social media through word/picture searches is not currently offered elsewhere. Our invention will fill a void in these areas and meet needs.

Purpose of the Invention

The invention consists of two main parts/concepts/categories.

The first part, can be compared to completing a puzzle together when each member holds one piece of the puzzle or a chain letter/message in which chains of information connect and together form graphs or lists.

Within the scope of this first part, the first step is to choose a theme. For example, it the theme is family ties or relatives, it could develop in the following format. The first user, Carol, down loads the application and begins the first piece of the puzzle, or first chain by filling in a form that requires some information to be shared. This information is manifested in family and relative connections as well as a distance measurement ability. For example Carol fills out the form letting the system know that her mother is Rita, her father John, her siblings Jack and Susan, her children Karla and Will. Carol also lets the system know that Bill is the husband of her sister Susan. Contact information and social media accounts of these relatives, through which invitations may be sent to the family connections (such as WhatsApp, email, Facebook etc.) are also entered.

In this way each family member that Carol has reported receives and invitation to join the system.

At the same time the system reveals the distance between members. For family/relative members a distance measurement that consists of steps or jumps it takes to reach the other is suggested ("hop" in Turkish). For example for Carol, her sister Susan is at one jump distance. But her sister's husband Bill is two jumps distance from Carol. The sister of her brother in law would be three "jumps" away.

This is different than systems which find missing information by matching known information, helping relatives to discover other relatives on social media. Instead in our application known pieces of contributed information joins known information like pieces of a puzzle to reveal a larger whole and known members join by the invitation of other members. The common chain is formed with information provided by the user. Another difference between this and other patented material is that it provides a feature of measuring distance between member of a graph in addition to seeing the nature of the connections.

As the chain or puzzle grows with more people associated with the theme responding to the invitation, it can take the form of various graphs. There may be many different kinds of graphs, but for the current example, a "family network graph" is suggested. It could be pictured as a family tree or in a different way and become a "family network map" on which members can scroll and see connection, distance, associations etc.

Another feature offered in this chain of connection or puzzle is that each member may interact, share, communicate with other members within boundaries they chose. Another feature offered is that the choices such as who may write a comment, who may see what is shared, who may send announcements or invitations can be made not only by using names and sub-groups but distance measurements between members. For example Carol may decide that relatives up to 7 jumps away may see her wedding pictures, everyone may see her profile Picture, and only those 3 jumps away may see her child's graduation pictures. She may only allow those 1 jump away to comment plus her grandmother.

The chain of manifesting and mutual puzzle can be done with various themes.

For example, women who gave birth to their first child in the past 12 month may form a chain that spreads from woman to woman across the World. This is different than those who invite friend to join a group because it is formed to be a chain like a chain letter. Various methods are used to keep the chain from breaking. For example, in order for a woman to be a member the form she fills out may require her to add at least two other women who have given birth to their first child that year. The woman joining can give the Facebook address of a celebrity that has given birth that year one other person she has heard of or a distant friend who has. For a narrow these such as having given birth to your first child in the previous year 2 additional invitations may be seen as sufficient for the chain to continue. However, for broader groups such as Buddhists between age 30-35 years old the required invitation could be at least 5 more people they know or have heard of.

Unit of distance measurement may differ according the themes and needs and has the potential for many creative options. For example, the distance measurement unit between women who have given birth to their first child in the last year could be geographical proximity or education level. Or the distance measurement units for 30-35-year-old single Buddhists with a master's degree could be how many free time activities they enjoy that they have in common. For those who use a particular kind of automobile, the distance measurement could degree of education or yearly income or how much time they spend on the care of their car each week. Mathematical combinations may be applied to incorporate more than one quality to come up with a measure of distance between members according to needs and themes.

The graphs that form can vary depending on the foundational purposes of the chains.

The reason this patent emphasizes the service as an application rather than a social media feature is the concern about it bumping into a different patent. However, in cases where it would not conflict with another patent, these features should be patented for social media use as well.

For example, one of the features of these graphs or lists that grow in chain connections, is that members who contribute a piece of the larger puzzle can eventually form a huge Picture that encompasses the whole World such as a family network graph. The family network graph, or family network map (Aile a{hacek over (g)} grafi{hacek over (g)}i in Turkish)—or any other kind of method for listing or grouping—. This Family Network Graph can now be used to drive a visual on-screen user interface element that may look like a classic Family Tree, or another visual or textual 1D, 2D, 3D or higher dimensional representation of family relations. At its most basic, the Family Network Graph based user interface may present a zoomable, scrollable, rotatable, tilt able, clickable, annotatable or otherwise interactive visualization of family members and their ties that allows the social media accounts of, and information shared by, other family members to be explored, navigated, monitored, searched, visualized, liked, commented or otherwise interacted with.

A fundamental functionality of this visual user interface element is that it can filter and thus limit the amount of information seen by the user during normal use in a number of ways.

For example, the visual user interface element may have a functionality where only family members who are less than five "hops" away from the person who is currently at the "center" or "focus" of the user interface element are visible or displayed prominently. So, if the visual user interface element is currently centered or focused on a "family member A1", a "family member F3", who is related to family member A1 through 7 other family members and is thus "eight hops" away from family member A1, would not be visible, or would be grayed out, reducing the amount of people displayed, and information relating to said people, in the visual interface element to a more manageable quantity.

Like a zoomable, pan able, rotatable and scrollable electronic geographic map (e.g. Yahoo Maps, Google Earth) or a network diagram, the user would have the ability to start focused on any desired person anywhere in the family's Family Network Graph (or any other group or list with or without any other theme)—by typing in the user's name for example—and then navigate towards any other person in the Family Network Graph (or any other group or list with or without any other theme) by zooming and scrolling and panning or possibly clicking on various visual elements of this interactive "visualization of family members and their relation to each other".

Chains or graphs that are formed with different themes may use different distance measurements and offer the same service with different distance measurements. For example, geographical distance, education level, income level, mutual interest measurements, computation designed to incorporate more than one quality etc.

The second part/concept/category of this invention, may be used as a feature that enriches the first part or as a separate service in its own right.

In this second concept the application asks the user for the social media page or accounts of members and/or what the nature of their relationship is (for example in the case of the family network graph, uncle/mother/son, or in the case of other groups and lists, friend, acquaintance, colleague, researched institution, magazine, woman who gave birth in April etc. . . . ) and saves this information to a memory base or/and data base. In this way the application (or/and if patenting allows the social media feature) enables the user to organize those on his/her list in terms of networks, lists, groups, trees etc. For example, the application may define the people on the list as family/relative trees, close friends, certain authors, certain media addresses, certain customers, certain institutions etc. lists or networks.

This application, has the capacity to communicate with or interact with the targeted social media services or internet search engines, mobile applications or other software, services, mobiles, transports, gateways, communication protocols, or interfaces—the social media user's vehicle can connect with the social media service.

The user interface component, enables navigation, monitoring, communication, interaction with the family network graph or any other group, graph, list, social network, social media account.

This may be used as an application service in and of itself. For example, the user may add the Facebook, Instagram, twitter accounts of newspapers he/she wants to follow into the system and write "child abuse 2011" on the search engine to find pictures, written accounts, videos related to this subject. Or in a similar way to the first part/concept/category of this invention, he/she may choose groups, lists, graphs around various themes and follow/search their social media accounts. For example, he/she can write in the search feature: "pictures of pets shared by members up to 4 jumps distance."

Or she can search her old boyfriend's Facebook account that is open to everyone to see for all pictures shared between the dates Dec. 30, 2014-Feb. 22, 2014. Or for example Betsy may wish to add photographs to her photo album and search all pictures shared of Mark Brown up to 4 jump distances away, easily find all such pictures her relatives have allowed her to see and add them to her album. Or this search feature may be used for completely different uses.

In other words, while this second part/concept/category of service may be used as an addition to the first service concept of chain graphs, lists, groups formed around themes, it is also independently valuable as a way to gain Access to information shared in social media easily and efficiently.

There are many service possibilities under encompassed by these two concepts/categories.

Chains that spread around themes gathering members find the opportunity to have connections, sharing possibilities, bonds in a way that can also avoid information pollution.

The invention not only provides a way to reach information quickly and efficiently it provides a way for social connection, social context, social life.

BRIEF DESCRIPTION OF THE FIGURES

FIG. 1 is a flow diagram of an example method for creating and using a themed graph to obtain and present search results from one or more social media services.

EXPLANATION OF THE INVENTION

Through the application that has been down loaded, a huge puzzle and communication chain is formed with cooperation. In the case of family ties theme, as in someone having only a small piece of a huge puzzle, filling out family member names, information in a form, inviting them to join and forming a family network graph (for example a family tree).

Not just on the theme of family/relative ties, but other groupings a graph, list, group is formed (for example those who have pet lizards, those who like a particular car brand, mothers who gave birth to their first child in the past 12 months etc.) and groups spread through connections chains.

Important note: This is to be distinguished from social networks the find each other through matching up. Those who agree to down load the add after invitation, add information on suitable members they know in the requirement section of the forms, and by such additions a chain is formed, like forming a huge puzzle that spreads throughout the World together, in the form of a family network graph or any other graph, list, group. The graph that forms around a family tree or any other theme, is a chain that is encouraged to continue with the aim of not breaking and is like a huge puzzle formed together.

The person enters information about relatives and the nature of their relationship in a form after which these relatives are invited to join. Or depending on the type of group formation (for example women who have given birth to their first child in the past 12 months, write the names and contact information of women they know with this quality, and a chain is begun) and those added to the form receive invitations to join. If the chain is not broken it can spread throughout the World. In this way a family/relative connection chain can manifest. The family chain graph (for example a family tree) or graphs formed with other themes grow and in this way members can view other members and observe defined distance units between them.

Various methods are used that encourage chains not to break. For example, in order for a woman who had her first baby this year to join (instead of having to fill out required sections that ask for the names of relatives as in the family network graph chain for invitation), she could be asked to add information of at least two women she has heard of who have their first baby this year for invitation to join. The system would then send an invitation to the two women who she entered.

The down loaded application asks the user,

A. For the social media pages and accounts of those whom it will connect

B. And/or what the nature of the relationship is between them is (For example, uncle/mother/sister etc., colleague, institutions being researched, women who gave birth to their first child in the past year . . . )

C. And/or information needed for measurement determined by what type of unit the system is programmed to calculate (For example, for the family network graph where distance is measured by "jumps" the family connection such as mother, sister etc. or for connection between women who have had their first baby the geographical region of user or books read in the past two years by user or activities enjoyed by user or education of user, how many followers the person has to fit a definition of "volume," how many likes he/she received for the defined concept of "weight measurement" etc.).

This information is saved in its memory or data base. In this way, the application gives the user the ability to organize those on the list in form of various networks, lists, groups, graphs and trees. For example, a list, network, group or graph on family/relative tree, close friends, colleagues, authors, specific media addresses, customers, institutions can be defined as the user wishes by the system. The software application (or internet search engine or mobile app or other software, service, gateway, communication protocol, interface, user) has the ability to contact and interact with targeted social media services, internet or connected application.

The user interface gives opportunity for navigation, observation, interaction, communication with the family network graph (or another group, list, theme graph, social media accounts, social networks).

Family network graph definition: It is an information formation (such as a computer data base) which can store and show who is the member of a family, what the nature of a family member is with other family members, what the distance between members are in measurable units (such as "jumps").

A measurement unit can be (but is not limited to) a "jump" or "hop" which is a label for how many relatives are between the two members. Other measurement units for distance may also be defined.

For example: Paul K is the uncle of Thomas K. Thomas K is the nephew of Paul K. Lisa K is the sister of Thomas K and also Paul K's niece. The distance between Paul K and his nephew Thomas K could be defined as 2 jumps or 2 hops because the distance is measured as jump from uncle to parent to child. The same distance would be between Paul K and his niece.

Graphs that are formed on other themes than family connection can be measured or calculated by the system in different units. For example, a connection graph between mothers who had their first baby in the past year could be required to enter their geographical region in the form which could then be used as a distance measurement. Hence a mother with a new born could search for feelings of mothers in a particular region. Chains that advance around different themes and graphs can chose different relevant units for distance measurement. For example, geographical region, educational similarity, income similarity, hobby similarity, computational value based on more than one variable used as a distance unit, age, books that are liked etc. The definition of distance can change according to the needs.

In a family network graph (or a graph formed with any other theme, or network, list, group, connection) can also define the unit to measure distance between objects with a computation derived from a combination of more than one variable. For example, the age, education and "number of books that both parties like" could be together be combined computationally into a valid and relevant measurement of distance. Then with a distance measure that is derived from such a computation, the user can decide to invite those at close distance to himself to his book club or use the distance measurement to select for introduction on a marriage partner finding site, or for contact/advertising purposes of a potential customer during a new book release.

Based on the family network graph (or other graphs) formed by progressive chains of information, there is an interactive visual user interface that can be organized according to the needs and individuals. A computational application that can work with the family network graph's (or another graph's) (1) visual user interface (2).

Users may use distance measurement units relevant to their purpose to determine who may see what they share, who may comment, who will receive messages, announcements, invitations, advertisements from them and many other purposes.

Search engine: By entering a Word or clusters of words, data can be reached. For example, a search with the words "2011 cat pictures posted (on Facebook and/or family graph etc.) by relatives at 3 jumps distance." Through the defined networks, lists, groups, graphs (such as family trees), people and institutions spread out over many different social media pages and accounts can be navigated and specific information/data collected in a very fast, efficient, easy way.

At defined intervals or criteria, automatic checks of the social media pages of the people or institutions. In this way filtering, indexing or when requested downloading to the user's device, new messages, links, photographs, videos or other data.

Sending information to other persons through various means. Thus, interesting data shared on social media service "A" can easily be sent to social media services "B", "C", "D", "E" using the networks, lists, groups or graphs (such as family network graph/tree).

Being able to give conditional instructions or commands to the user's computer, application or internet search engine to perform these functions. For example, "Use chrome internet search engine, down load to my computer the new pictures my friend Mahmut Melekoglu shares on Facebook." "Down load Pictures Mahmut Meleko{hacek over (g)}lu shares on Facebook to my photograph album titled "close friends photo archive 2017"" "Find CNN web site child abuse key word search for 2011." "Facebook pet pictures shared by those on my customer list"

Using this application, many things shared and messages shared, may be saved to a data base or depo device but then also shown to the user in a format that is controllable or configurable. For example, "University friends' funny links that shared, presented in a list from top to bottom and notify user when a new one is shared (notify through a sound, email, SMS text message etc.)." "Send comic links that have received 5 likes or more to those in my number 4 friends list." "Automatically send information labelled "funeral" by my niece to relatives a 3 jumps distance from me."

The application can use artificial intelligence and machine learning techniques so that over time, it can determine which data is very important, moderately important or unimportant to the user. In this way it can scan the social media accounts of 140 people in two hours and send only 10-15 important or "relevant" data to the user. Over time it can become more advanced in what the user finds important or unimportant. For example, the user may not like jokes that be little marriage and in these ways the system can filter, evaluate, gather or index social media shared data.

The visual interface does not merely enable a social media user to navigate data or profile pages that he/she is interested in. The visual interface can also notify the user, through text, color, emphasis, pop ups, icons, visuals, animation and other vehicles that a member of the family network graph (or any other chain) has shared content or other information that might be worth viewing. In other words, the communications or actions of those in the family network graph (or other graphs, lists, groups, chains) can be displayed in the visual user interface as automatic notifications or can change the appearance or function of the visual interface.

With its users, the application can form a communication network or "mini social media network" completely independent from social media services. In them those who know each other, relatives or those centered around another themes can chat, message, share photo albums, video conference, play games together, plan social activities, form graphs together, form family trees together, prepare pages together with various themes, share what they prepare, coordinate, share news, share family news, have projects around family announcements etc. and perform many other activities.

The application can also join different application users acquaintance/friend/relative lists networks, graphs, trees, and form a large network in order to establish an independent mini social media network and make it function. It can thus offer many functions that are normally found in fixed social media services. In addition, shared data that the application finds on various fixed social media services can be shared again on this mini social media network between people. While shared data from normal fixed social media can be transferred to the mini social network, at the same time, this mini social network can transfer information and shared data to the normal social media services.

The system or service is given the ability to define which other users of the system are relatives, and what the nature of their relation to the user, such as father, brother, cousin, is and thus the social networking system is now able to construct a family network graph.

Once this family network graph is in existence, which is an electronic representation of who is related to whom in what way, a visual user interface based on this graph allows the user of the social networking system to use a zoomable, scrollable, rotatable, filterable, searchable, color code able and otherwise customizable and interactive visual or textual representation of a family network graph to do a number of things. The same service is also there for groups formed around other themes, connection, labels.

The family network graph or other graphs can be used to do navigation by the application. The family network graph can be used to easily define and control whose communications the user sees or is notified of, or, conversely, who sees or is notified of the communications placed on the social network system by this user.

The family network graph can be used to define smaller groups of related users in a larger social network, allowing multi-user activities such as relatives using a chatroom together, planning an event together, playing games together, exchanging funny content, creating a collaborative family album, creating a news feed of important family events collaboratively, and more, to be facilitated easily. The same functions are available for groups centered around other themes. For example, people who have pet birds, people who like to wear particular brands, those who drive a particular brand car, customers, women who gave birth to their first child etc.

Many different set ups or customizations of network graphs or other groupings can be used for different application activities. These can be for set up and order of different relatives and/or different application services more easily.

This Family Network Graph (or other kinds of grouping or listing) can now be used to drive a visual on-screen user interface element that may look like a classic Family Tree, or another visual or textual 1D, 2D, 3D or higher dimensional representation of family relations.

At its most basic, the Family Network Graph (or other grouping, listings) based user interface may present a zoomable, scrollable, rotatable, tilt able, clickable, annotatable or otherwise interactive visualization of family members and their ties that allows the social media accounts of, and information shared by, other family members to be explored, navigated, monitored, searched, visualized, liked, commented or otherwise interacted with.

A fundamental functionality of this visual user interface element is that it can filter and thus limit the amount of information seen by the user during normal use in a number of ways. For example, the visual user interface element may have a functionality where only family members who are less than five "hops" away from the person who is currently at the "center" or "focus" of the user interface element are visible or displayed prominently.

So, if the visual user interface element is currently centered or focused on a "family member A1", a "family member F3", who is related to family member A1 through 7 other family members and is thus "eight hops" away from family member A1, would not be visible, or would be grayed out, reducing the amount of people displayed, and information relating to said people, in the visual interface element to a more manageable quantity.

Like a zoomable, vertical or horizontally scrollable, panable, rotatable electronic geographic map (e.g. Yahoo Maps, Google Earth) or a network diagram (or grouping, listing with other themes) the user would have the ability to start focused on any desired person anywhere. For example, by typing the user's name in the Family network graph (or other lists, groups, graphs) and then navigate towards any other person by zooming and scrolling and panning or possibly clicking on various visual elements, thus using this interactive visualization of members and their relation to each other. Various chains and graphs with various themes can have various distance measurement units, enabling the functions to take place using distance units. (Depending on the themes distance units could include geographical distance, educational similarity, income, books that are mutually read or computational combinations of variables etc.)

But the "visualization of family members" (or other group visualizations) would typically not show all members of a larger family at the same time. Rather, it would limit the amount of family members displayed on screen at any one time using customizable criteria like "show at the center (focus) only family members who are less than 4 hops away from the person I am currently centered on, female and over the age of 18". Like a Google map these chain maps can be viewed from a distance, viewed close up or scrolled.

During typical use on a social media site, this "filtered visualization of family members" would occupy only a small portion of the screen, or open and close or grow and shrink on demand, and any family member the user centers the map on or selects via mouse clicking or other means would automatically have their social media profile page or other information displayed in portions of the screen not covered by the map interface element.

Chains and graphs formed under various themes may define and chose different units for distance measurement. More over measurements other than distance can be defined and calculated such as weight that consists of "how many stars a customer receives" in order of importance, or emotional weight of a relative etc. Various functions can be obtained within the context of these measurements. For example, closeness in terms of educational background, weight in terms of how many stars the person has received, time spent talking on the phone etc. . . .

The described functionality and user interface may be provided by an external software application running side-by-side with the social media service on the user's electronic device, such as a tablet computer.

As the application provides Family network graph (or other graphs, groups, lists) for its members, and with visual representation profile pages, it also provides the opportunity to communicate with participants in other fields, including search, monitoring, gathering information, sending information, messaging, viewing what is shared.

Through various technical mechanisms, it is possible to social media account pages and what they share automatically.

One significant advantage the external software application version of this invention would have, would be that the Family Network Graph defined by the user would have the ability to stretch across, and interact with, multiple different social networking services.

After the application has been downloaded, if different family members (or different members of any group) enter conflicting information as they from a family tree together (or any other group graph, structure) they have the ability to communicate with each other to arrive at the best conclusion. Increasing joining pieces of the puzzle together, enables relatives (or members of another group) to gain access to information they would not normally have, see the nature of the connection and interact with new people. In systems only joining friends with friends this service is not provided.

This navigation may occur through zooming, panning, scrolling, tilting, rotating, hyperlinks, keyboard, mouse, stylus or touch screen input, or user input through any other possible input device, including a microphone, a web camera or a hand gesture recognition system.

A fundamental feature of the visual user interface element is that multiple instances or configurations of a Family Network Graph (or other graphs, groups, lists) with different settings may be defined and stored side by side to accomplish different user tasks. One user defined Family Network Graph or Family Network Graph configuration may be used to monitor "funny jokes" posted by close family members, for example. Another may be used to keep track of "children's pictures" or "pet photos" posted by select other family members. A third may be used to invite select family members to play online games together at a specified time of day. A fourth may serve the purpose of sending out periodic family event invitations to family members who are "no more than 8 hops away from the user" in the Family Network Graph being used.

In a chain of people who gave birth to their first child, a mother might wish to see what other mothers no more than a 1000 km Radius do about hygiene or invite mother in a 5 km Radius to her house for tea with the hope of forming a play group for the children. Chains and graphs formed with different themes could chose different measurement units. For example, geographical distance, "weight" of the relationship measured with how many times you talk on the phone, income level, "volume" measurement unit defined in terms of how many followers a person has, mutual free time activities etc.

The visual user interface element may not only allow the user of a social media network to navigate to particular profile pages or feeds of family member's one is interested in. The visual user interface may also indicate through text, color, highlighting, icons, images, animation or other means that a family member has shared a particular type of content or other information on a social media service that may be important or worthwhile to view. In other words, automated notifications about the communications or other actions of other users in a Family Network Graph (or other graphs, groups, lists) may be displayed in the visual user interface, or alter the appearance or functionality of the visual user interface.

The ability to search or filter information present on a social media service using the Family Network Graph (or other graphs, chains, lists, groups) and visual interface element is an important functionality of this invention. For example, is a user wishes to find a video shared in the past but can't remember which member had shared it, or when or with which labels then he/she can search: "June 2013-February 2014, pet videos, at a distance of 7 jumps away." The same function could also allow useful functionality like "compile a photo album of children's pictures posted by relatives no more than 8 hops away from within the last 5 years, only showing pictures that were liked or highly rated by at least 5 relatives". This would automate the task of creating a photo album of the children of reasonably close family members, compiled from photos that were highly rated by multiple family members and can thus be considered "family treasures" or "worthwhile to include in the photo album". In this example, the invention would effectively allow a "history of our family's children over the last 5 years" to be compiled on demand with relatively little effort. Or in the case of a different theme, a chain of people who love the Volvo brand car, could be searched for "Volvo accessories" they shared in pictures or texts. Different themes and needs can define different measurement units. For example, geographical distance, educational similarity, income, mutual interests etc.

In profile pages, there can be sub-pages and sharing areas. Although these may be places to share on various themes including those listed below, they are not limited to this use.

Funny sub-page: My favorite caricature, my favorite joke, a joke I played on a family member and filmed, the funniest family memory etc.

Family treasures sub-page: Something my parent did that I value the most, something about my child that I am so proud of, a memory that touched me the most in my family etc.

Albums sub-page: It enables visitors to enter and see, down load, share photo albums and video album, any kind of albums, of a member, to the extent that the member allows. The album sub-page has an important feature in which the system can use labels to order, list, categorize album content (pictures, videos etc.) according to the directives of the user. For example, pictures with labels on them that indicate the date can be lined up by date and as a new Picture is added it can be placed in the correct spot chronologically by the system. Also content can be placed according to other labels, creating sub-album, and categories of albums (such as pet pictures, happy day pictures, school memories, pictures of a particular person etc.). Or using the search feature of the system, particular album content shared by other members can be found such as "2011 picture of Ali Mert, shared by people at 9 jump distance." As with other content each member can determine who will be able to find, view, comment on, down load album content.

Wisdom sub-page: My favorite recipe, my favorite quote, what my family enjoys doing together the most, what I do to honor parents and family elders, what I admire and take as my model the most in my parents, something I have done to my family that I wish I had done differently, something I would advise a new parent etc.

Personal Sharing Sub-Page

Words of love field: Each member writes something they really value or feel inspired by in family members at least 2 jumps away. They also write a memory they treasure with this family member. They write what they will miss the most if the family member were to move to a distant country and they could not see them again. Everyone the person who shares and receives allow can read these "words of love". If there is abuse, the user can erase and block and prevent this person from seeing him/her in the future. An additional feature may also be used in which those who wish to write in more sensitive sections have to get permission first. In order to encourage filling out meaningful areas such as "words of love" pop-ups and reminders can be set in motion reminding members to write to those within a determined close distance such as those 2 jumps away.

Blessings over family: Parents, grandparents can write blessings over their children and grandchildren. For example: "May the Lord bless you and keep you. May you . . . " Again, to encourage writing blessings over their children parents and grandparents can receive pop-up reminders such as: "You have not written a blessing over your grand son Michael. Would you like to write a blessing now? Click here to view some suggestions on how to write a blessing and some sample examples of blessings . . . ."

For different themes and uses of the chain lists, graphs, groups there can be different sharing fields. Also, relevant measurement units can be used. For example, income, similarity in education, geographical region, books in common etc.

Known theme fields such as those above having mutual/common topic pages, can help the user to search for data in the light of topics he/she is aware of and then view, experience, read, listen to these common threads. For example, a user who is feeling bored at home, could spend half an hour of enjoyable time, reading funny subpages, or looking at favorite caricatures in funny subpages of relatives within a 10-hop distance. Or a member feeling the need for family ties and affection could enjoy a quiet time reading the results that come from her/his search: "Words of love sub-page, favorite family memories, 4 jumps distance." Or they can read what the "White family" enjoys doing for family activity or "Susan and Susan's daughters" favorite recipes." In a different chain of mothers who had their first baby in the past year a search "Turkish speaking mothers, poems to their babies" could offer great reading material.

Personal sharing, up to date information, connection, fellowship, social life are important. This service seeks to give access to data and information on social networks in an efficient, unpolluted, speedy way but also seeks to provide emotional closeness, friendship, social access in an increasingly busy world.

The user can enter sub-pages with known themes and also enter "sharing rooms." These can include but are not limited to areas where they can share difficulties and stress, touching moments, joys/celebrations, what are my dreams etc. Users determine who may see or comment in these sections. Entering or not entering these sharing rooms is the choice of the user.

But it is recommended that some themes appear on the screen each time it is used for any purpose. For example, for the family network graph purposes these could be "the most important moment in the last month (or given period of time)" and "announcements." Having announcement appear each time a user enters the service, or having the most important moments of the month of family members within a certain distance would insure that members feel a sense of guarantee their announcement will be read by all and their most important moment of the past month will be seen by all. Such features consistent with the nature of the specific chain theme, will provide a mutual sense of bonding, a common ground of connection among members.

Another feature that can increase bonding among members is a place to announce what times of what days you are available or looking for someone available to play games. This could also be seen at a corner upon entrance into the system. In games that are played, a feature could be added in which member feed some of their own pictures into the system and are given character that looks like themselves. In other words, as a mutual time is found to play football with relatives, the football player played by A, could also be drawn out by the system in a flattering way to also look like A. A could be given options of different ikons that all look like himself/herself, created using the pictures he/she has uploaded.

An important suggested feature, that helps avoid information pollution is the feature titled "most important moment of the month." For example, if a slide show pops up every time a user enters the system, showing the most important moments of the month for family members 4 jumps away, they will see only what the other members consider their most important moments pass by. So, mother's most important moment was her "husband's surgery," sister Carol's most important moment was "graduation" etc. shared with annotations, pictures etc. This will enable them to see the most meaningful moments of relatives rather than scroll through much information/sharing overload. This feature can differ in format depending on the needs of different chains or themes or purposes. For example, in a chain of people who drive a particular brand of car, it could be the greatest difficulty he/she had with the car in the past 6 months, and the solution. For teachers of first graders in a chain it could be the most important thing you learned about how to be a good teacher in the past year. Time periods can change. For example, in a chain among professional sportsmen, "the most important victory of the year" or "the most important lesson of the week" etc.

In the family network graph or other theme connection chain, the most important thing in a given time period, shared in written, visual, auditory or other forms, sifts information pollution. For example, if a member has 60 relatives, the average amount of new posts regarding most important moment of the month would average 2 per day. These would also be posts considered most important by the person sharing them and hence allow meaningful, less over loaded information sharing.

Depending on the designers wish, or group's purposes, pop ups seen by all when the system is entered can be determined. This will insure that some information consistent with the system goals are seen by all frequently. For example, in the family network graph, every time a user enters the system, "announcements by relatives" and/or "most important moments of the month" could be seen. This will also cause sharing some pre-determined common ground and/or fellowship.

For example, sharing rooms where stresses, difficulties, dream are shared among relatives may or may not be visited by a busy relative who uses the system for research purposes. But this user will still be up to date with most important moments in relatives lives and announcements. This will help meaningful, heart to heart bonding in a short time avoiding information pollution. The user will also have the option of leaving a quick comment, message, feedback, reaction on the important moments of relatives. Communication will be efficient and meaningful.

In short, this patented service provides a method for reaching information on social media easily and efficiently but also facilitates emotional sharing, bonding, socialization. In an age where time is increasingly scarce, socializing with efficient time use is important.

In this specific example of the family network graph, the second feature to appear on the screen every time a user enters, could be that of announcement. This would ensure that when a user makes an announcement it will indeed be seen by everyone who uses the system for any purpose.

The specific features seen by all members upon entrance can be designed according to the goals of the unique chain.

When sharing a feature such as the most important moments of the month, or an announcement, the user can determine who will see it. They can also determine and limit who may add feedback, answers, messages, comments etc.

Relatives could have options such as decreasing the size of pop ups with the most important moments of the month into the corner of the screen. Having the feeling that relatives will see what is most important to us and can comment is an important part of the service.

The most important moments of the month (or a particular time period) are stored and can be found with searches such as "Carol, most important moment of the month, April 2011" (if Carol has allowed the user to see her information). Or for example, the user could decide to see his/her own most important moments of the past 2 years, and have a nostalgic time looking over 12×2=24 important pictures/texts/audios etc. (over the past 2 years, one for each month). These can also be saved in the albums category as a sub category.

The system also can contain features encouraging users to share, read, answer etc. various parts. For example, pop ups and signal can come on the screen.

The family members who share the data, can determine who can see it (using individual names, groups, or other measurements such as distance measured in jumps). For this reason, the user of the search feature will reach limited data. Who can see what is shared, comment, give feedback, can be determined with defined measurement units (such as jumps, weight measured in stars, activities in common, geographical region etc.) or other lists. Chains and graphs with different themes or goals can define measurement units differently. For example, geographical distance, educational similarity, income, mutual free time activities, volume defined by follower number, weight defined by how many likes they get each year etc.

The functions described above, enables many social media services to be seen at the same time (instead of being integrated into a social media service), by the external software application and thus can provide many additional functions.

For example, when the user can perform a search: "Year 2016, interior house decoration, shared by those within 8 jumps distance, excluding Instagram." In this search, the external software application searches many social media services and finds interior house decorations according to the stated criteria not including those shared on Instagram. It eliminates information over load by defining which social media services will be included or excluded in the instruction given to the external software application. In chains with different purposes or themes different measurement units can be defined and used. For example, instead of defining distance with how many jumps away a member is, the "weight of a member" could be defined by how many likes he/she gets in a year.

The functions, activities, tasks described above, are presented for use in as broad a scope as possible, not just for apps but for social media networks, TV, games etc.

FIG. 1 is a flow diagram of an example method for creating and using a themed graph to obtain and present search results from one or more social media services. A themed graph that identifies users and defines relationships between the users can be identified. Each of the users identified in the themed graph may be associated with an account with one or more social media services. An application that is separate from the one or more social media services can receive user input that identifies a first user, an account of the first user with the one or more social media services, a relationship of the first user with a plurality of other users, and accounts of the plurality of other users with the one or more social media services. The themed graph can be updated to identify the first user and the plurality of other users, to define the relationship between the first user and the plurality of other users, and to associate each of the first user and the plurality of other users with the respective account with the one or more social media services. The application can receive a search request that specifies a distance measurement from the first user. The themed graph can be accessed to identify a set of users defined in the themed graph that are within the specified distance measurement from the first user. For each user in the set of users, the account with the one or more social media services that is associated with the user can be identified. For each user in the set of users, the account with the one or more social media services that is associated with the user can be accessed to obtain results for the search request. The application can then present the results for the search request.

The invention claimed is:

1. A method for creating and using a themed graph to obtain and present search results from one or more social media services, the method comprising:
   identifying a themed graph that identifies users and defines relationships between the users, each of the users identified in the themed graph being associated with an account with one or more social media services;
   receiving, at an application that is separate from the one or more social media services, user input that identifies a first user, an account of the first user with the one or more social media services, a relationship of the first user with a plurality of other users, and accounts of the plurality of other users with the one or more social media services;
   updating the themed graph to identify the first user and the plurality of other users, to define the relationship between the first user and the plurality of other users, and to associate each of the first user and the plurality of other users with the respective account with the one or more social media services;
   receiving, at the application, a search request that specifies a distance measurement from the first user;
   accessing the themed graph to identify a set of users defined in the themed graph that are within the specified distance measurement from the first user;
   for each user in the set of users, identifying the account with the one or more social media services that is associated with the user;
   for each user in the set of users, accessing the account with the one or more social media services that is associated with the user to obtain results for the search request;
   presenting, via the application, the results for the search request;
   receiving additional user input that identifies a second user, an account of the second user with the one or more social media services, a relationship of the second user with a second plurality of other users, and accounts of the second plurality of other users with the one or more social media services;
   updating the themed graph to identify the second user and the second plurality of other users, to define the relationship between the second user and the second plurality of other users, and to associate each of the second user and the second plurality of other users with the respective account with the one or more social media services;
   receiving a second search request that specifies a first distance measurement from the second user;
   accessing the themed graph to identify a second set of users defined in the themed graph that are within the first distance measurement from the second user, the second set of users including the first user;
   for each user in the second set of users, identifying the account with the one or more social media services that is associated with the user;
   for each user in the second set of users, accessing the account with the one or more social media services that is associated with the user and the themed graph to obtain results for the second search request; and
   presenting the results for the second search request to the second user.

2. The method of claim 1, wherein the relationships defined by the themed graph are familial relationships.

3. The method of claim 1, wherein the relationships defined by the themed graph are life event relationships.

4. The method of claim 1, wherein the relationships defined by the themed graph are interest relationships.

5. The method of claim 1, wherein the relationships defined by the themed graph are one of:
   connections made for research purposes;
   connections for professional or business goals;
   connections in an organization; or
   connections in a community.

6. The method of claim 1, wherein the specified distance measurement comprises a number of hops from a particular user.

7. The method of claim 1, wherein the specified distance measurement comprises one of:
   a qualitative measurement of a user;
   a quantitative measurement of a user;
   a qualitative measurement of a connection;
   a quantitative measurement of a connection;
   a volume measurement;
   a weight measurement;
   a geographic measurement;
   a time measurement;
   a temperature measurement;
   an energy measurement;
   an emotional quality measurement;
   nominal, ordinal, interval or ratio scales;
   comparative or non-comparative scales;
   a descriptive measurement;
   a diagnostic measurement;
   a predictive measurement;
   a measurement based on statistical findings; or
   a similarity measurement.

8. The method of claim 1, further comprising:
   providing a search feature by which data pertaining to other users that are within a specified distance measurement is accessed.

9. The method of claim 1, generating, by the application, a user interface that presents a portion of the themed graph, wherein the portion of the themed graph is centered on a particular user and includes a number of users within a particular distance measurement from the particular user.

10. The method of claim 1, further comprising:
presenting most important moments and associated content for at least some of the set of users based on user input.

11. The method of claim 1, further comprising:
automatically presenting notifications to the first user when the set of users update their accounts with the one or more social media services.

12. The method of claim 1, further comprising:
receiving, from the first user, an indication that content from the account of the first user with the one or more social media services should not be shared with users that are not within a second distance measurement from the first user in the themed graph;
determining that the second user is not within the second distance measurement from the first user; and
preventing content from the account of the first user with the one or more social media services from being included in the results for the second search request.

13. The method of claim 1, further comprising:
receiving, from the first user, an indication that users that are not within a second distance measurement from the first user in the themed graph cannot comment on content from the account of the first user with the one or more social media services, the second distance measurement being less than the first distance measurement;
preventing a particular user, who is within the first distance measurement from the first user but not within the second distance measurement from the first user, from commenting on the content.

14. One or more non-transitory computer readable media storing computer executable instructions which when executed implement a method for creating and using a family network graph to obtain and present search results from one or more social media services, the method comprising:
identifying a family network graph that identifies users and defines relationships between the users, each of the users identified in the family network graph being associated with an account with one or more social media services;
receiving, at an application that is separate from the one or more social media services, user input that identifies a first user, an account of the first user with the one or more social media services, a familial relationship of the first user with a plurality of other users, and accounts of the plurality of other users with the one or more social media services;
updating the family network graph to identify the first user and the plurality of other users, to define the familial relationship between the first user and the plurality of other users, and to associate each of the first user and the plurality of other users with the respective account with the one or more social media services;
receiving, at the application, a search request that specifies a number of hops from the first user;
accessing the family network graph to identify a set of users defined in the family network graph that are within the specified number of hops from the first user;
for each user in the set of users, identifying the account with the one or more social media services that is associated with the user;
for each user in the set of users, accessing the account with the one or more social media services that is associated with the user to obtain results for the search request;

presenting, via the application, the results for the search request;
receiving additional user input that identifies a second user, an account of the second user with the one or more social media services, a familial relationship of the second user with a second plurality of other users, and accounts of the second plurality of other users with the one or more social media services;
updating the family network graph to identify the second user and the second plurality of other users, to define the familial relationship between the second user and the second plurality of other users, and to associate each of the second user and the second plurality of other users with the respective account with the one or more social media services;
receiving a second search request that specifies a number of hops from the second user;
accessing the family network graph to identify a second set of users defined in the family network graph that are within the number of hops from the second user, the second set of users including the first user;
for each user in the second set of users, identifying the account with the one or more social media services that is associated with the user;
for each user in the second set of users, accessing the account with the one or more social media services that is associated with the user and the family network graph to obtain results for the second search request; and
presenting the results for the second search request to the second user.

15. The non-transitory computer readable media of claim 14, wherein the results include photos.

16. The non-transitory computer readable media of claim 14, wherein the method further comprises:
presenting a user interface to the first user that includes a portion of the family network graph.

17. The non-transitory computer readable media of claim 16, wherein the portion of the family network graph is centered on the first user and includes users within a particular number of hops from the first user.

18. A method for creating and using a themed graph to obtain and present search results from one or more social media services, the method comprising:
identifying a themed graph that identifies users and defines relationships between the users, each of the users identified in the themed graph being associated with an account with one or more social media services;
receiving, at an application that is separate from the one or more social media services, user input that identifies a first user, an account of the first user with the one or more social media services, a relationship of the first user with a plurality of other users, and accounts of the plurality of other users with the one or more social media services;
updating the themed graph to identify the first user and the plurality of other users, to define the relationship between the first user and the plurality of other users, and to associate each of the first user and the plurality of other users with the respective account with the one or more social media services;
receiving, at the application, a search request that specifies a distance measurement from a particular user;
accessing the themed graph to identify a set of users defined in the themed graph that are within the specified distance measurement from the particular user;

for each user in the set of users, identifying the account with the one or more social media services that is associated with the user;

for each user in the set of users, accessing the account with the one or more social media services that is associated with the user to obtain results for the search request;

presenting, via the application, the results for the search request;

receiving additional user input that identifies a second user, an account of the second user with the one or more social media services, a relationship of the second user with a second plurality of other users, and accounts of the second plurality of other users with the one or more social media services;

updating the themed graph to identify the second user and the second plurality of other users, to define the relationship between the second user and the second plurality of other users, and to associate each of the second user and the second plurality of other users with the respective account with the one or more social media services;

receiving a second search request that specifies a number of hops from the second user;

accessing the themed graph to identify a second set of users defined in the themed graph that are within the specified number of hops from the second user, the second set of users including the first user;

for each user in the second set of users, identifying the account with the one or more social media services that is associated with the user;

for each user in the second set of users, accessing the account with the one or more social media services that is associated with the user and the themed graph to obtain results for the second search request; and presenting the results for the second search request to the second user.

19. The method of claim 18, wherein the themed graph is a family network graph.

\* \* \* \* \*